United States Patent
Shak et al.

[11] Patent Number: 5,233,553
[45] Date of Patent: Aug. 3, 1993

[54] APPARATUS FOR PERFORMING MODULO ARITHMETIC WITH THREE-PORT ADDER

[75] Inventors: Myron Shak, Palo Alto; Timothy E. Decker, Foster City; Jim S. Blomgren, San Jose, all of Calif.

[73] Assignee: Chips and Technologies, Inc., San Jose, Calif.

[21] Appl. No.: 665,499

[22] Filed: Mar. 6, 1991

[51] Int. Cl.$^5$ ............................. G06F 7/38; G06F 7/50
[52] U.S. Cl. ...................................... 364/746; 364/768
[58] Field of Search ............... 364/746, 768, 744, 745, 364/771, 784, 786

[56] References Cited
U.S. PATENT DOCUMENTS

| | | | |
|---|---|---|---|
| 4,831,570 | 5/1989 | Abiko | 364/768 |
| 4,852,040 | 7/1989 | Oota | 364/768 |
| 4,893,267 | 1/1990 | Alsup et al. | 364/745 |

Primary Examiner—Long T. Nguyen
Attorney, Agent, or Firm—Townsend Townsend Khourie and Crew

[57] ABSTRACT

A method and apparatus for emulating the intermediate 16-bit truncation of the address in the 8086 architecture using a 32-bit adder. The preferred embodiment of the invention adds the displacement, base address, and segment base values in a three-port carry save adder. The displacement value and base address are also added together in a two-port full adder. The outputs of the three-port carry save adder and two-port full adder are then compared to determine whether a carry from bit 16, if any, resulted from the addition of the displacement and base address value or the addition of the segment base value. A logic unit determines whether a carry into bit position 16 of the linear address is modified. If the carry is the result of the addition of the segment base value to the effective address, the carry is not modified. If the carry is the result of the addition of the base and displacement value, the carry is modified by forcing the bit position 16 to zero.

17 Claims, 3 Drawing Sheets

| STATE | A<br>CARRY BIT 15<br>WITHIN THE<br>ADDER 454 | B<br>CARRY BIT 15<br>IN 3 PORT<br>ADDER 440 | C<br>CARRY BIT 15<br>IN 2 PORT<br>ADDER 438 | D<br>16 BIT ADDRESS<br>MODE LINE | E<br>CARRY NEEDED<br>INTO BIT POS<br>1710. 16 OF<br>ADDER 448 |
|---|---|---|---|---|---|
| 1 | 0 | 0 | 0 | 1 | 0 |
| 2 | 0 | 0 | 1 | 1 | X NOT POSSIBLE |
| 3 | 0 | 1 | 0 | 1 | 1 |
| 4 | 0 | 1 | 1 | 1 | 0 |
| 5 | 1 | 0 | 0 | 1 | 1 |
| 6 | 1 | 0 | 1 | 1 | 0 |
| 7 | 1 | 1 | 0 | 1 | X NOT POSSIBLE |
| 8 | 1 | 1 | 1 | 1 | 1 |
| 9 | 0 | 0 | 0 | 0 | 0 |
| 10 | 0 | 0 | 1 | 0 | X NOT POSSIBLE |
| 11 | 0 | 1 | 0 | 0 | 0 |
| 12 | 0 | 1 | 1 | 0 | 0 |
| 13 | 1 | 0 | 0 | 0 | 1 |
| 14 | 1 | 0 | 1 | 0 | 1 |
| 15 | 1 | 1 | 0 | 0 | X NOT POSSIBLE |
| 16 | 1 | 1 | 1 | 0 | 1 |

FIG. 5.

APPARATUS FOR PERFORMING MODULO ARITHMETIC WITH THREE-PORT ADDER

BACKGROUND OF THE INVENTION

The present invention relates to an apparatus which computes the linear address of an instruction using a threeport adder in a microprocessor.

In order to execute an instruction, the microprocessor must first fetch the instruction from its location in memory. Instructions in memory are stored at their physical address. Typically, in a microprocessor system using paging and segmentation of its memory, the physical address is computed in a series of steps. First, the effective address is calculated. The effective address is calculated by the addition of the base address value within a segment to the displacement value. Second, the linear address is calculated by adding the segment base address value to the effective address. Finally, the linear address is translated into the required physical address using a Translation Lookaside Buffer.

Microprocessors have different standard address lengths. A microprocessor may use an address length of 16 bits or 32 bits, for example. Typically the paging and segmentation portion of the address are assigned the higher order bits.

FIG. 1 shows a block diagram of the standard logic configuration 110 used to calculate the linear address in a 16-bit mode in the Intel 8086. Computation of the linear address is accomplished in two steps. First, the base address value on a bus 112 and the displacement value on a bus 114 are added in a two-port adder 116. In the configuration shown, the addition of the 16-bit displacement value and 16-bit base address value are output onto a 16-bit bus 118. Therefore, if the addition of the base address value and displacement value results in a value over 16 bits, modulo arithmetic is performed so that the effective address value is truncated and the carry bits are lost. The truncation of the effective address value results in a wrap around of the effective address value so that it points within the 64 K memory boundary.

In the second stage of calculating the linear address value, the 16-bit effective address on bus 118 is zero extended by bus 120 to result in a 20-bit bus 122 which is then added to a 20-bit segment base on bus 128. In the actual Intel 8086 design, the 16-bit segment base on bus 126 is shifted left by four bits as shown by bus 124. This results in a 20-bit bus 128. Bus 128 is then added to the 20-bit bus 122 by a 20-bit adder 130 so that the addition of the segment base value to the effective address results in a 20-bit output value on bus 132.

FIG. 2 illustrates the wraparound which occurs in 16-bit mode when the sum (the effective address) and the operand are both 16-bit values, and the calculation of the effective address results in a value which would be greater than 16 bits had additional bits been allocated for output. For example, if the base address value is $(2^{16}-1)$ and the displacement value is 11, the effective address is not $((2^{16}-1)+11)$. Instead the effective address is truncated so that it is within the allocated 16 bit positions. Since only 16-bit positions exist, the carry bit is lost and the effective address wraps around so that it points to an effective address of 10.

FIG. 3 shows a three-port 32-bit adder 326 which may be used in a modern 32-bit address architecture. The adder has two parts. A three-port carry save adder first stage 328 produces a sum and carry bit for each bit position. A second stage two-port adder 330 takes the 32 sum bits and 32 carry bits, propagates the carry and produces a 32-bit sum as its output. The adder cannot only generate 32-bit addresses but can also, in a 16-bit mode, produce 16-bit addresses (or 20 bits for the Intel 8086 extended addressing). This is important because many users have programs for machines using the Intel 8086 which they would like to run on a new 32-bit machine.

A compatibility problem arises, however, because the 16-bit truncation of FIG. 1 is no longer present. The carry from the 16th bit is simply added in with the rest of the result. For example, if the base address is 65,535 $((64K-1)$ or $(2^{16}-1))$ and the displacement is 11, there will be wraparound in the first stage of FIG. 1, giving an effective address of 10. If this effective address is added to a segment base of 8192, the result is 8,202. Using the 32-bit adder of FIG. 3 this intermediate truncation will not occur. Instead, the 32-bit adder will simply add 65,535 to 11 and 8,192 giving a value 73,738 when the program was expecting a value of 8,202.

SUMMARY OF THE INVENTION

The present invention provides a method and apparatus for emulating the intermediate 16-bit truncation of the address in the 8086 architecture.

The preferred embodiment of the invention uses both a three-port carry save adder and a two-port full adder. The displacement, base address, and segment base values are input into a 32-bit three-port carry save adder. The displacement value and base address value are input into a 32-bit two-port adder. The internal carry bits of the three-port carry save adder and the two-port adder are then compared to determine whether a carry into bit position 16, if any, resulted from the addition of the displacement and base address or the addition of the segment base address. If the carry results from the addition of the segment base address, the resulting carry is not modified. If the carry is the result of the addition of the base address and displacement, the carry is modified by forcing the bit position which receives the carry value (bit position 16) to zero.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a state table illustrating the possible conditions for allowing or inhibiting the carry value.

DESCRIPTION OF THE SPECIFIC EMBODIMENT

Figure 4:
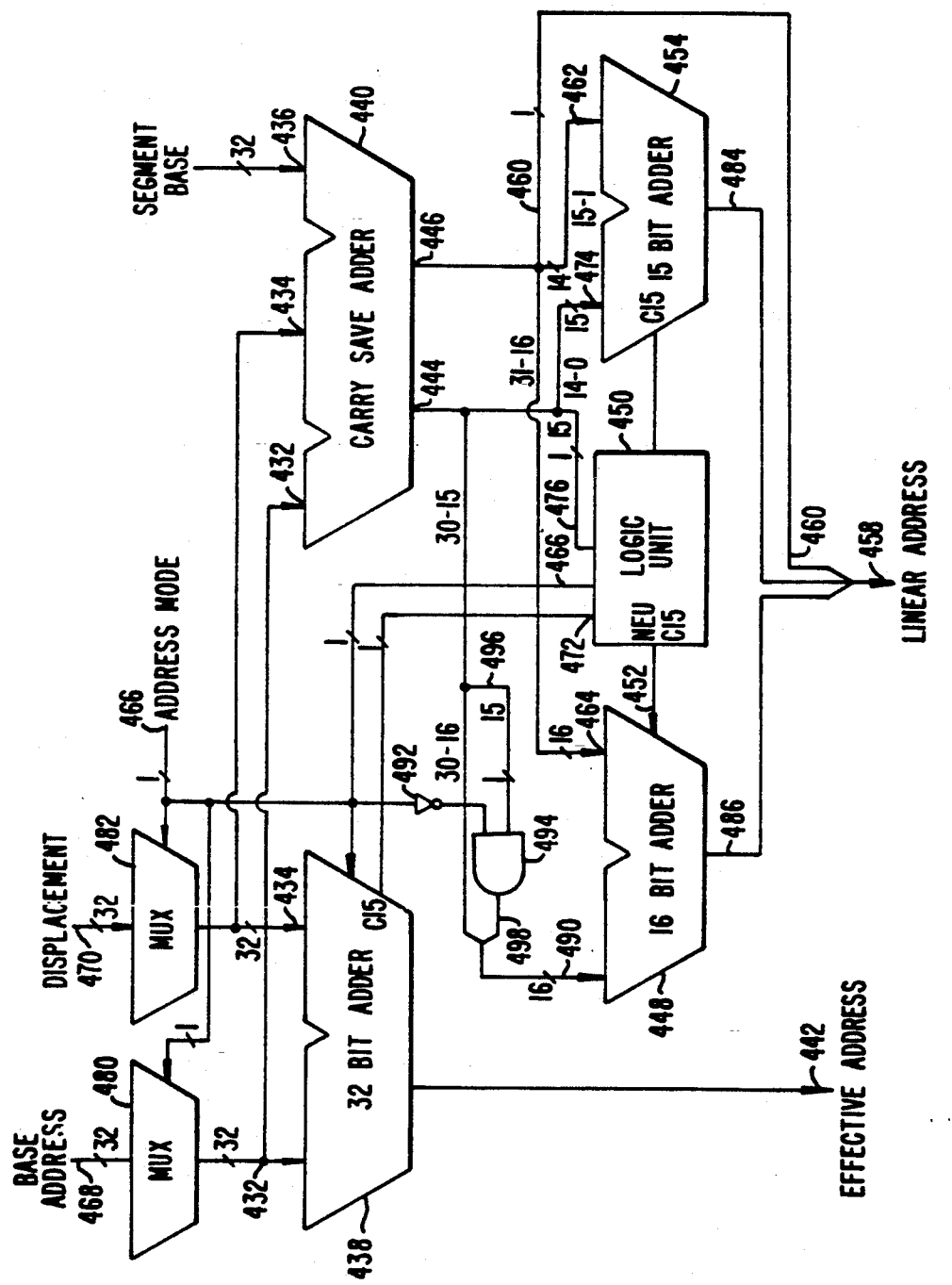
FIG. 4 is a block diagram of the preferred embodiment of the present invention for calculation of the linear address in the 32-bit mode.

FIG. 4 is a block diagram of the preferred embodiment of the present invention for emulating the 8086 logic for calculation of the linear or effective address while in the 16-bit or 32-bit mode. Whether the present invention is in the 16-bit or 32-bit mode is indicated by a line 466, the address mode line. Line 466 is input into two 32-bit multiplexers 480 and 482. If the microprocessor is in the 16-bit mode, the uppermost 16 bits of the base address value on bus 468 and displacement value on bus 470 are zeroed out before output onto buses 432 and 434. In the 32-bit mode the uppermost 16 bits of the base address value on bus 468 and displacement value on bus 470 are passed through their respective multiplexers 480 and 482 before output onto buses 432 and 434.

The effective address is calculated in a two-port full adder 438 by adding the base address and displacement values. The 32-bit base address value is input into adder 438 on a bus 432, and the 32-bit displacement value input into adder 438 on a bus 434. The output on bus 442 is the effective address. Since the effective address output 442 must be used in other circuitry to perform addition calculations the adder 438 does not increase chip space used.

The base address value on bus 432 and displacement values on bus 434 are also input into a three-port carry save adder 440, in order to calculate the linear address. Instead of computing the linear address in two steps, by adding the base address and displacement values followed by the addition of the segment base value as performed in the prior art, the three port carry save adder 440 adds the three values simultaneously. The three inputs to the carry save adder 440 are: the base address value on a bus 432, the displacement value on a bus 434, and the segment base value on a bus 436. The outputs of three-port carry save adder 440 are the 32 carry bits on bus 444, and the 32 sum bits on bus 446.

The addition of the base, the displacement and segment base address is performed in two stages. A first stage consists of a three port carry save adder 440. A second stage consists of a 15-bit full adder 454, a 16-bit full adder 448, and a logic control unit 450. The 15-bit adder 454 adds sum bits (1-15) from carry save adder 440 to carry bits (0-14) of carry save adder 440 to calculate bits (1-15) of the linear address. The 16-bit adder 448 adds sum bits (31-16) from carry save adder 440 to carry bits (30-15) from carry save adder 440 to calculate bits (31-16) of the linear address which is output on bus 486. Line 460 is bit 0 of the linear address. Combined buses 486, 484, and line 460 form the 32-bit linear address on bus 458.

The problem with emulating the logic used in the 8086 using the 32-bit adders in the configuration of FIG. 4 is threefold. First, the intermediate truncation of carry bits, which occurs after the addition of the base and displacement values, no longer occurs in the 32-bit adders. For example, in the 16-bit mode the addition of a base address of 65,535 (($64K-1$) or ($2^{16}-1$)) and a displacement of 11 is a sum of 10, instead of the sum of 65,556 (($2^{16}-1$)+11) which would result using 32-bit adders. This is because when using 16-bit adders, the carry from the addition of the base and displacement values into bit position 16 is lost, since only bit positions (0-15) exist in the 16-bit adders. In 32-bit adders, bit position 16 exists and therefore the carry into bit position 16 resulting from the addition of the base and displacement value is present. In order to emulate the truncation of the 8086, the carry into bit position 16 must be modified.

A second problem in emulating the logic of the 8086 when using the configuration of FIG. 4, is the ability to distinguish between a carry resulting from the addition of the base and displacement value and a carry resulting from the addition of the segment base value. Since we want to emulate the logic of the 8086, the carry into bit position 16 must be inhibited when it results from the addition of the base and displacement value. However, the carry into bit position 16 should not be inhibited if it results from the addition of the segment base value.

A third problem in emulating the logic of the 8086 when using the configuration of FIG. 4, is the ability to distinguish between a 16-bit address calculation and a 32-bit address calculation. Since the carry bit need only be modified in the 16-bit mode, the microprocessor must signal the adders whether the microprocessor is in the 16-bit or 32-bit mode.

In 16-bit addressing mode, three features are active to compensate for address wrap arounds. The first feature is zeroing carry-bit 15 on line 498 into adder 448 as shown in FIG. 4. Carry-bit 15 is zeroed by the logic performed by AND gate 494 and inverter 492. In 16-bit addressing mode bus 466 is 1. This signal is inverted in inverter 492 and input into AND gate 494 along with carry bit 15 from line 496. Since one input is always zero in the 16-bit mode, AND gate output 498 (carry-bit 15) is always zero. Zeroing this bit nullifies the chance of having two carries into bit position 16 in linear address calculations.

The second feature is zeroing the upper 16 bits of adder 438 so that the effective address is always a 16-bit quantity. The third feature is modifying the carry-in bit to adder 448, this is the carry in for bit position 16 in linear address calculation. This carry bit is modified so that linear address calculations ignore carries due to only the addition of the base and displacement value. The table in FIG. 5 illustrates what this carry bit into adder 448 should be for different conditions.

The table in FIG. 5 is a state table which shows all of the theoretical combinations of carrys in adders 438, 440 and 454. Column A of the table in FIG. 5 indicates whether there is a carry out of bit position 15 of adder 454. Column B indicates a carry out of bit position 15 of carry save adder 440. Column C indicates a carry out of bit position 15 of adder 438. Column D indicates whether the microprocessor is in the 16-bit or 32-bit mode. In states 1-8 the microprocessor is in the 16-bit mode. In states 9-16 the microprocessor is in the 32-bit mode. Column E indicates the carry bit of logic unit 450 which is the carry bit into adder 448.

In state 1 of FIG. 5, no carry results from adder 454, adder 438, or carry save adder 440. Since no carry results into bit position 16, the logic unit 450 should not produce a carry and thus there is a 0 in column 6 of the state table.

States 2 and 7 are two of four states which are not possible in the current configuration. In state 2 of FIG. 5, the sum of the base and displacement in adder 438 is one, yet the carry bit in adder 454 and 440 are zero. This state is impossible, since if a carry results from the addition in adder 438, a carry must also result from either adder 454 or adder 440. In state 7, no carry results from the addition of the base and displacement value in adder 438, yet adder 454 and 440 generate carries. This is not possible since adder 454 and 440 cannot both generate a carry bit without a carry resulting from adder 438. In other words, since no carry results from the calculation of the effective address, only the base or displacement value can have a value of one. To have the carry bit be one in both adder 454 and 440 would require both the base and displacement value be one.

In states 3 and 5 of FIG. 5, a carry is allowed. Since no carry results from the addition of the base address value and displacement value (column C of FIG. 5), then the resulting carry must be from the addition of the segment base value and should be allowed.

In states 4 and 6 of FIG. 5, the sum of the base and displacement value in adder 438 results in a carry, and either the carry bit 15 from adder 440 or the carry bit 15 from adder 454 are set, but not both. This means that the resulting carry must be the result of the addition of the base and displacement values and the carry is inhibited. The only way a carry can occur due both to the addition of the base and displacement and the addition of the segment base value is when all three carry values from adders 438, 440, and 454 are set. Therefore the carry in states 4 and 6 must be the result of the addition of the base and displacement values and the carry into bit position 16 of adder 448 should be inhibited.

In state 8 of FIG. 5, the carry bits in adders 438, 440, and 454 are set. This means that a carry resulted both from the addition of the base and displacement values and from the addition of the segment base value. Since a carry resulted from the addition of the segment base value, the carry should not be inhibited but should be allowed.

A logic unit 450 performs the required logic to control the carry into bit position 16 of adder 448. The inputs to logic unit 450 are: carry bit 15 of adder 454, carry bit 15 of adder 440, carry bit 15 of adder 438, and the address mode line. The address mode line signals the adders whether the microprocessor is in the 16-bit or 32-bit mode. If the microprocessor is functioning in the 32-bit mode (states 9-16 of FIG. 5), carry bit 16 of adder 448 is not modified by logic unit 450 since the truncation occurring in the 16-bit mode does not occur in the 32-bit mode.

Figure 1:
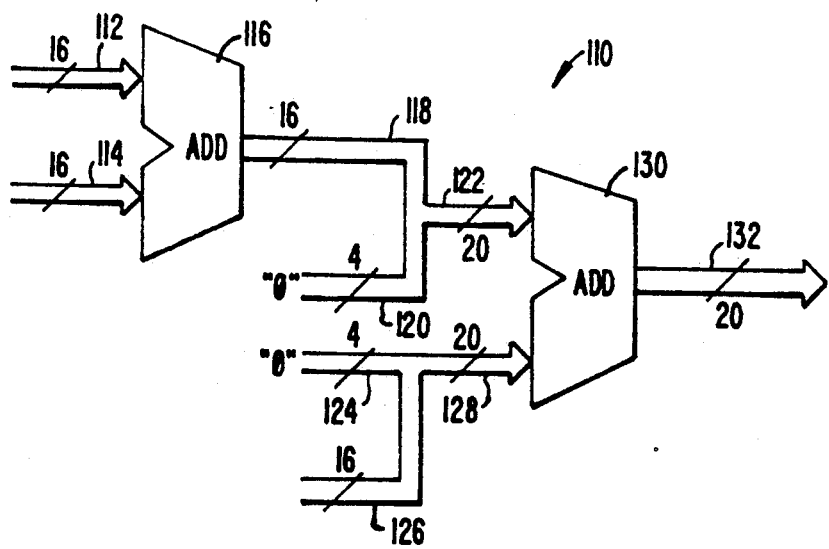
FIG. 1 is a block diagram of a prior art two-stage two-port adder used for calculating the linear address in the 16-bit mode.
Figure 2:
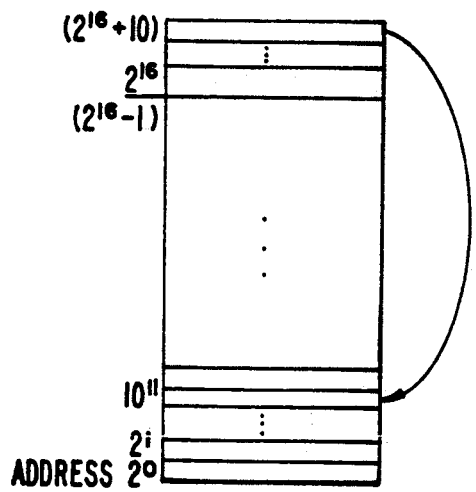
FIG. 2 is a diagram illustrating the wraparound which occurs when a carry results from calculating the effective address in the 16-bit mode.
Figure 3:
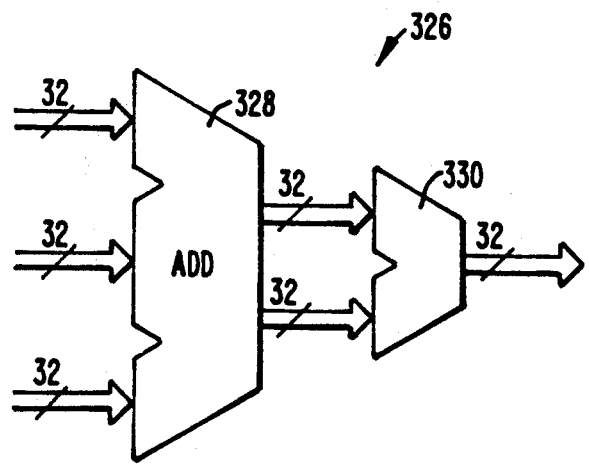
FIG. 3 is a block diagram of a prior art three-port adder in the 32-bit mode.

In the 16-bit mode carry bit 16 of adder 448 is modified according to states 1-8 of the truth table illustrated in FIG. 5. In the 16-bit mode the logic unit 450 is able to distinguish between whether the carry in bit position 16 of adder 448 is the result of the addition of the base value to the displacement value or the addition of the segment base value. If the carry is a result of the addition of the base address value and displacement value, the carry should be inhibited since the carry would have been truncated in the logic of FIG. 1. The carry out bit position 15 of adder 454 is inhibited by the internal logic of logic unit 450 so that a new carry bit with a value of 0 is output on line 452 into bit position 16. The new carry in bit 15 replaces the original carry in bit of adder 448. If the carry is the result of the addition of the segment base value, the carry is allowed. The carry out bit position 15 of adder 454 is allowed to pass through logic unit 450 so that a carry bit with a value of 1 is output on line 452 into bit position 16. The new carry in bit 15 replaces the original carry in bit of adder 448.

The logic equation used to generate a carry into bit position 16 of adder 448 is "E=AC'+AD'+AB+BC'D". In this equation, A is represented by carry bit 15 of adder 454, B is carry bit 15 of adder 440, C is carry bit 15 of adder 438, D is the address mode line and E is the carry needed into bit position 16 of adder 448 (see FIG. 5). This logic equation can be implemented using NAND gates, exclusive OR gates or other standard logic.

As will be understood by those familiar with the art, the present invention may be embodied in other specific forms without departing from the spirit or essential characteristics thereof. For example, the present invention can be used for calculating a linear address for any memory length. For example, the intermediate truncation resulting from the inhibition of the carry bit, may occur at a bit position other than bit 16. The present invention could also use logic other than NAND gates, or a lookup table to determine whether to allow or inhibit the carry function. Accordingly, the disclosure of the preferred embodiment of the invention is intended to be illustrative, but not limiting, the scope of the invention which is set forth in the following claims.

What is claimed is:

1. An apparatus for calculating a sum of a first, second and third values comprising:
   a two stage adder for adding said first, second and third values, said two stage adder including a first stage adder for outputting an intermediate carry and a second stage adder for outputting a sum; and
   a logic means, coupled to said two stage adder for determining if said intermediate carry of said first stage adder results from the addition of said first and second values, and for modifying said intermediate carry if said logic means determines said carry results from the addition of said first and second values.

2. The apparatus of claim 1 further comprising a second adder for adding said first and second values and indicating the presence of a carry at a bit position of said intermediate carry.

3. The apparatus of claim 2 wherein said first and second values are a base address and a displacement.

4. The apparatus of claim 3 wherein said third value is a segment base value.

5. The apparatus of claim 1 wherein the inputs to said logic means include a bit 15 carry of said second adder, and a bit 15 carry of said two stage adder.

6. The apparatus of claim 1 wherein said first stage adder is a three-port carry save adder producing a sum and a carry bit for each bit position and, said two stage adder further comprises a second stage full adder for producing a final sum from said first stage sum and carry bits.

7. An apparatus for calculating a linear address of an instruction, comprising:
   a two stage adder for adding three values, including a base and a displacement; and
   a logic means, coupled to said two stage adder, for determining if the addition of said base and displacement causes a carry at a next bit position past an intermediate bit position, and for inhibiting said carry at said next bit position.

8. The apparatus of claim 7 further comprising a second adder for adding said first and second values and indicating the presence of a carry at a bit position of said intermediate carry.

9. The apparatus of claim 8 wherein said three values are a base address, a displacement, and a segment base value.

10. The apparatus of claim 7 wherein the inputs to said logic means include a bit 15 carry of said second adder, and a bit 15 carry of said first stage of said two stage adder.

11. The apparatus of claim 7 wherein said two stage adder comprises a first stage producing a sum and a carry bit for each bit position and a second stage full adder for producing a final sum from said first stage sum and carry bits.

12. A method for calculating an address from a first, second and third values comprising the steps of:

first, adding said first, second and third values in a two stage adder, said two stage adder including a first stage adder for outputting an intermediate carry;

second, determining in a logic unit coupled to said two stage adder if an intermediate carry in said first step results from the addition of said first and second values; and third, modifying said intermediate carry inn said logic unit if said second step determines said intermediate carry results from the addition of said first and second values.

13. The method of claim 12 wherein said first and second values are a base address and a displacement.

14. The method of claim 12 wherein said third value is a segment base value.

15. The method of claim 12 further comprising an intermediate step of adding said first and second values, and wherein said second step includes the steps of providing as inputs to a logic unit a bit 15 carry of said intermediate step, and a bit 15 carry of said first step.

16. An apparatus for calculating an address from a base address, displacement and segment base values comprising:

a three-port adder including a three-port carry save adder first stage for adding said base address, a displacement and segment base values producing a sum and a carry bit for each bit position and a second stage consisting of a full adder for producing a final sum from said first stage sum and carry bits;

means for adding said base address and displacement values;

logic unit for determining if an intermediate carry produced by said three-port carry save adder first stage resulted from the addition of said base address and displacement values, the inputs to said logic unit being a bit 15 carry of said means for adding and a bit 15 carry of said three-port carry save adder first stage, said logic unit being coupled to said full adder of said second stage, said logic unit inhibiting said intermediate carry if said logic unit determines said intermediate carry results from adding said base address and displacement.

17. A method for calculating an address from a first, second and third values comprising the steps of:

adding said first and second values in a single stage adder, said single stage adder outputting a first intermediate carry;

adding said first, second and third values in a two stage adder, said two stage adder including a first stage adder for outputting a second intermediate carry and a second stage adder for outputting a sum, wherein said first value is a base address, said second value is a displacement, sad said third value is a segment base value;

providing as inputs to a logic unit coupled to said two stage adder said first and second intermediate carries;

determining if said second intermediate carry results from the addition of said first and second values; and third, modifying said second intermediate carry if said determining step determines said second intermediate carry results from the addition of said first and second values.

* * * * *